Jan. 24, 1967 J. A. COX, JR 3,300,613

MOUNTING ARRANGEMENT HAVING MEANS FOR ACCURATELY LOCATING A PLURALITY OF SWITCHING DEVICES

Filed Oct. 22, 1965 2 Sheets-Sheet 1

INVENTOR.
JOHN A. COX, JR.
BY Philip J. Zrimsek
ATTORNEY.

INVENTOR.
JOHN A. COX, JR.
BY Philip J. Zumsel
ATTORNEY.

United States Patent Office 3,300,613
Patented Jan. 24, 1967

3,300,613
MOUNTING ARRANGEMENT HAVING MEANS FOR ACCURATELY LOCATING A PLURALITY OF SWITCHING DEVICES

John A. Cox, Jr., Freeport, Ill., assignor to Honeywell Inc., Minneapolis, Minn., a corporation of Delaware
Filed Oct. 22, 1965, Ser. No. 501,925
7 Claims. (Cl. 200—168)

The present invention is directed to a mounting arrangement which allows for the accurate location of a first plurality of devices with respect to and above a second plurality of devices where interaction between corresponding upper and lower devices is involved.

When an integrally formed group of first devices is arranged to interact with an integrally formed group of second devices, generally speaking there is no problem in aligning corresponding interacting devices as the accurate location of the corresponding devices can be designed and built into the integrally formed units. However, where modular components are employed, the accurate location thereof becomes important. It is with this aspect that the present invention is concerned. Also the present invention is concerned with a modular "no two operate" or interlock system which is specifically designed to be utilized in the mounting arrangement as well as being capable of independent use.

In the preferred embodiment of the invention as disclosed herein, actuating devices in the form of pushbutton switches are accurately located and secured to mounting means to form a first assembly and actuated devices in the form of modular components of a "no two operate" or interlock system are accurately located and secured to other mounting means to form a second assembly, the first assembly being accurately located and secured to the second assembly to allow the actuators of the pushbutton switches to interact with corresponding modular components. A great deal of flexibility is possible in the construction of complete units of the type just described insofar as the number of stations of a "no two operate" system is concerned, for example. Also, with such an arrangement, various other types of components can be associated with the pushbutton switches as, for example, alternate action mechanisms. Further, different types of modular components can be associated in an assembly as desired.

In view of the foregoing, it is an object of the present invention to provide a mounting arrangement whereby a first plurality of devices can be accurately located with respect to and above a second plurality of devices to allow interaction between corresponding first and second devices.

It is a further object of the present invention to provide a "no two operate" or interlock system which is modular in form so as to allow complete flexibility insofar as number of stations, repair and replacement, and the like is concerned.

It is a further object of the present invention to provide an arrangement as first described wherein the second devices are in the form of elements of a "no two operate" or interlock mechanism.

These and other objects will become more apparent from a reading of the following specification and appendant claims wherein:

Figure 1:
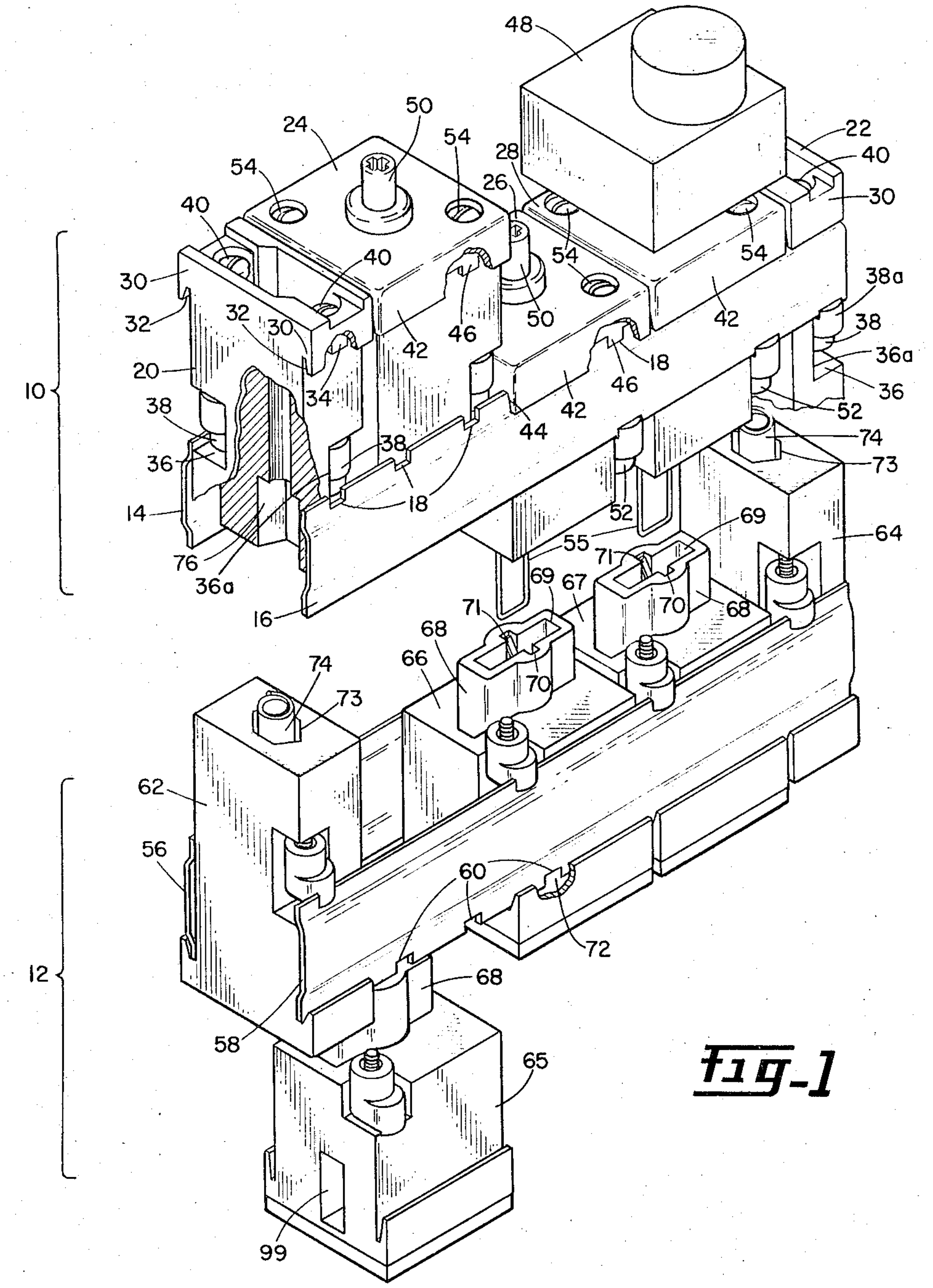
FIGURE 1 is a perspective exploded view of a first assembly of actuating devices in the form of pushbutton switches and a second assembly of modular components in the form of "no two operate" modules.

The mounting arrangement as shown in FIGURE 1 comprises a first assembly 10 and a second assembly 12. The first assembly 10 includes a pair of identical mounting bars 14 and 16 with notches 18 provided at regular intervals along the upper edges thereof. While the mounting bars 14 and 16 are associated with a pair of end supports 20 and 22 and three actuating devices in the form of pushbutton switches 24, 26, and 28, it is obvious that the mounting bars could be of any length to support any number of elements. The end supports 20 and 22 include overhanging portions 30 at their upper extremities so as to form channel passages 32 to accept the upper portions of the mounting bars 14 and 16 and in which tooth portions 34 are provided which are arranged to be accepted by the appropriate corresponding notches of the mounting bars when assembled thereto. The end supports 20 and 22 include cavities 36 on opposite sides thereof in which mounting lugs 38 are disposed. The mounting lugs 38 are supported in place by screw members 40 which pass through appropriate openings not shown in the end supports 20 and 22 and which are threaded into appropriate openings not shown in the mounting lugs. With the end supports 20 and 22 in place on the mounting bars 14 and 16 and with the tooth portions 34 associated with the appropriate corresponding notches 18, the elements can be fastened together by turning the screw members 40 in the appropriate direction which causes the mounting lugs 38 to be rotated so that an offcenter portion 38*a* thereof is disposed below the lower edges of the mounting bars. The mounting lugs 38 are limited in their rotational movement by appropriate surfaces 36*a* provided in the cavities 36 of the end supports 20 and 22 so that continued rotation of the screw members 40 causes the mounting lugs 38 to be moved upwardly and into engagement with the lower edges of the mounting bars 14 and 16 to thereby secure the end supports to the mounting bars. This type of fastening arrangement is generally akin to that disclosed in the Loy Patent 2,430,067 and forms no part of the present invention.

The pushbutton switches 24, 26, and 28 each include overhanging portions 42 at their upper extremities so as to form a channel passage 44 to accept the upper portions of the mounting bars 14 and 16 and in which tooth portions 46 are provided which are arranged to be accepted by the appropriate corresponding notches 18 of the mounting bars when assembled thereto. Each of the pushbutton switches 24, 26, and 28 are normally provided with an operating pushbutton 48 only one of which is shown for purposes of clarity. The pushbutton 48 includes appropriate means, not shown, to secure it to the actuating plunger 50 of each pushbutton switch. The pushbutton switches 24, 26, and 28 each include mounting lugs 52 on opposite sides thereof like those provided in the end supports 20 and 22 and by means of screw members 54 are arranged to be secured to the mounting bars 14 and 16 in the same manner as that described previously with respect to the end supports. Wire driving members 55 are associated with the plungers 50 of the pushbutton switches 24, 26, and 28 for reasons which will become apparent below.

The second assembly includes a pair of mounting bars 56 and 58 which can be identical to those utilized in the first assembly 10 except that in use the notches 60 are disposed downwardly rather than upwardly for reasons which will become apparent. End supports 62 and 64 which are of the same form as the end supports 20 and 22 utilized in the first assembly 10 are secured to the mounting bars 56 and 58 but in a reverse relationship with respect to the end supports 20 and 22.

Also secured to the mounting bars 56 and 58 are a number of modular components 65, 66, and 67 which in the preferred embodiment are elements of an interlock system of the "no two operate" type. The modular components 65, 66, and 67 each include a protrusion 68 having an opening 69 and slot 70 provided therein. Each wire driving member 55 is arranged to be disposed in opening 69 and associated with a plate member 71 located in the slot 70 for purposes which will be explained below. The number of modular components corresponds to the number of pushbutton switches and because of the notches 60 provided in the mounting bars 56 and 58 and the location of tooth portions 72 of the modular components they are disposed on the mounting bars in corresponding positions with respect to the pushbutton switches 24, 26, and 28 of the first assembly 10. It will be noted that the manner of securing the modular components 65, 66, and 67 to the mounting bars 56 and 58 is the same as that utilized in assembling pushbutton switches 24, 26, and 28 to the mounting bars 14 and 16.

The end supports 62 and 64 include a hexagonal opening 73 for slidably accepting a guide tubular sleeve 74. In assembling the first assembly 10 to the second assembly 12, the sleeves 74 associated with the end supports 62 and 64 are slidably introduced into the corresponding hexagonal openings 76 of the end supports 20 and 22 so as to provide a unitary structure of the first assembly 10 and the second assembly 12 wherein the pushbutton switches 24, 26, and 28 are accurately disposed over the modular components 65, 66, and 67 so as to allow for an interacting relationship therebetween. This is quite clearly shown in FIGURE 2 where the first assembly 10 and the second assembly 12 are assembled together and secured together by means of fasteners 78 which are disposed in and through counterbored openings 80 of the end supports 20 and 22 and counterbored openings 82 of the end supports 62 and 64. The unitary structure shown in FIGURE 2 can be mounted to a panel or other support by appropriate hardware not shown.

Figure 2:
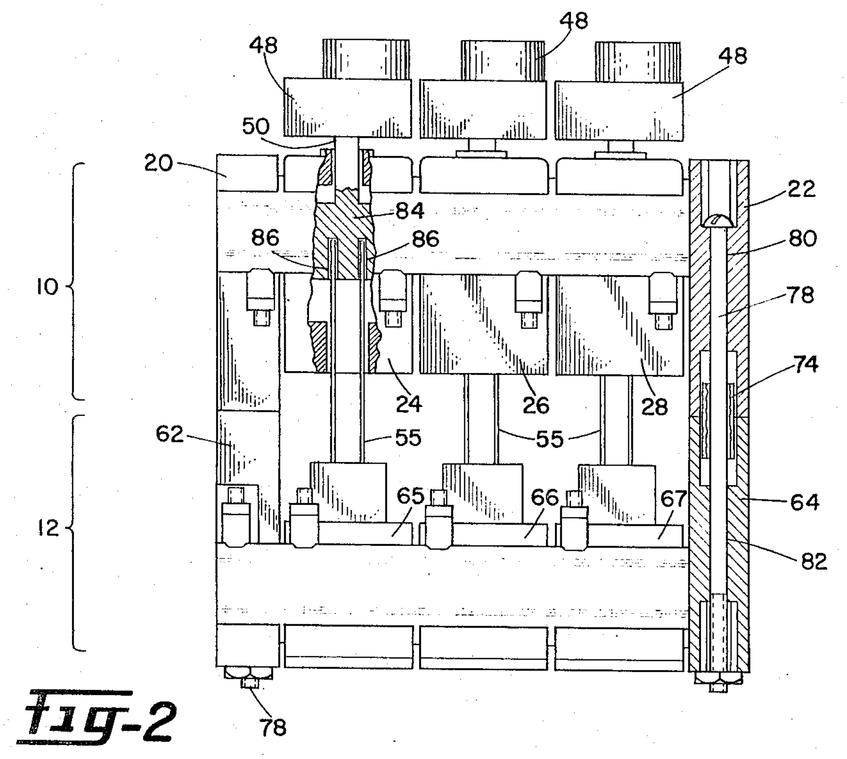
FIGURE 2 is a front assembly view on a smaller scale of the arrangement of FIGURE 1.

The pushbutton switches 24, 26, and 28 which can be of the momentary type and are normally in the position shown each include moving switch contacts, not shown, carried by, referring to FIGURE 2, a moving contact carrier portion 84 which forms a part of the plunger 50. The moving contact carrier portions 84 includes openings 86 at its lower extremity within which the upper extremities of the wire drive member 55 are disposed and supported by a frictional fit therebetween.

Figure 3:
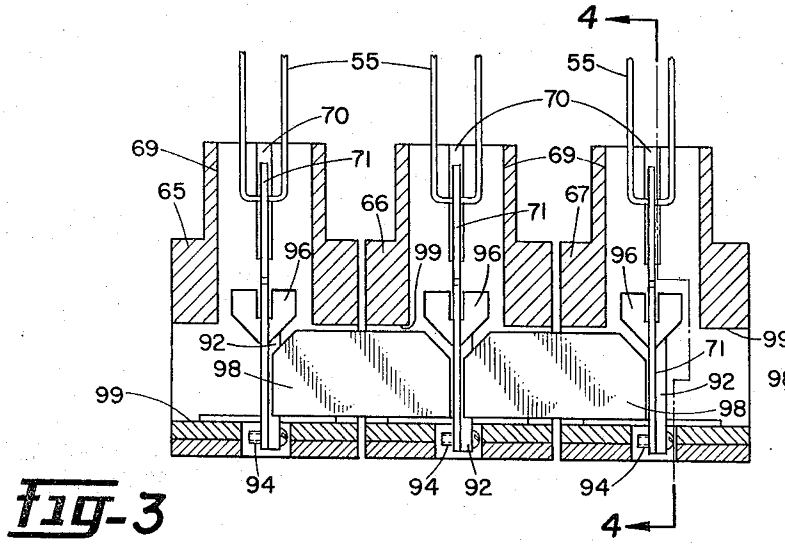
FIGURE 3 is a cross-sectional view on an enlarged scale of the "no two operate" modules of FIGURE 2.
Figure 4:
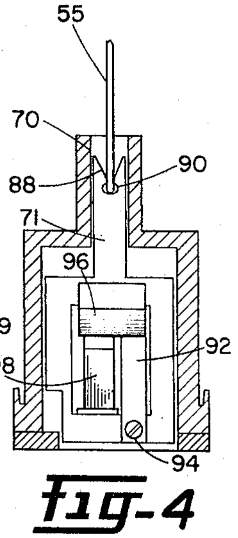
FIGURE 4 is a cross-sectional view of the "no two operate" module along the line 4—4 of FIGURE 3.

The lower extremity of each wire drive member 55 is disposed in the corresponding opening 69 and is associated with the plate member 71 located in the slot 70 of the modular components 65, 66, and 67 as is best shown in FIGURES 3 and 4. Each plate member 71 includes a V-opening 88 at its upper extremity terminating in a substantially circular opening. The V-opening 88 provides the necessary resilience in the arms of the V to allow a spreading apart thereof upon force being applied thereto by the lower extremity of the wire drive member 55 during assembly to allow the wire drive member to be inserted into the circular opening 90 so as to provide a detent fastening therebetween. A cam driver 92 which is attached to each plate member 71 by a screw fastener 94 includes a cam portion 96 for interaction with cam members 98 which are disposed in aligned openings 99 of the modular components 65, 66, and 67, a common cam member being shared by adjacent modular components. The cam portions 96 and the cam members 98 interact to provide a "no two operate" or interlock system. "The two operate" aspect per se does not form any part of the invention and is generally akin to that disclosed in the Radtke Patent 2,192,621.

Referring now to FIGURES 2, 3, and 4, it is apparent that any of the pushbuttons 48 of the pushbutton switches 24, 26, and 28 can be operated at one time to cause downward movement of the associated plunger 50 and moving contact carrier portion 84, wire drive member 55, plate member 71, and cam driver 92 to ultimately move cam members 98 so as to limit actuation of any other pushbutton switch until such time as the actuating force is removed from the first actuated pushbutton switch.

By utilizing a modular form of a "no two operate" or interlock system, it becomes possible to quite easily and inexpensively provide such mechanisms with a varying number of stations. Also, the modular form allows for ease in repair or replacement of particular stations. Further, not only can a "no two operate" or interlock system be provided in an assembly but it can be associated with other devices such as alternate action mechanisms, magnetic pull in and drop out devices, etc., providing for maximum flexiblity in an assembly.

As disclosed herein, an arrangement is provided which allows for the accurate location of a first assembly of devices with respect to a second assembly of devices disposed therebelow allowing for an interacting relationship therebetween. Further, a "no two operate" or interlock system has been disclosed which allows for maximum flexibility and is not limited as is the case in the prior art to be a pre-designed set number of stations.

While only a single embodiment of the present invention has been disclosed, other forms incorporating the invention are possible and therefore the scope of the invention should be gauged from the following claims.

I claim:

1. A mounting arrangement for accurately locating one device above another comprising: a first assembly including a first mounting bar, a first pair of end supports, said first mounting bar secured to corresponding outer surfaces of said end supports and accurately located with respect thereto by notch and tooth surfaces provided therebetween, and a first plurality of comparable devices secured to said first mounting bar and accurately located with respect thereto by notch and tooth surfaces provided therebetween; and a second assembly including a second mounting bar, a second pair of end supports, said second mounting bar secured to corresponding outer surfaces of said supports and accurately located with respect thereto by notch and tooth surfaces provided therebetween, and a second plurality of comparable devices secured to said second mounting bar and accurately located with respect thereto by notch and tooth surfaces provided therebetween; said first assembly disposed above and secured to said second assembly so that guide surfaces incorporated in said end supports accurately locate said first assembly with respect to said second assembly, the notch and tooth provisions in said mounting bars, end supports and devices so located that with said first assembly disposed with respect to said second assembly by said guide surfaces, said first devices are each accurately located with respect to a corresponding one of said second devices to thereby allow an interacting relationship to be set up therebetween.

2. A mounting arrangement for accurately locating one device above another comprising: a first assembly including a first mounting bar, a first pair of end supports, said first mounting bar secured to said end supports and accurately located with respect thereto by locating means provided therebetween, and a first plurality of comparable devices secured to said first mounting bar and accurately located with respect thereto by locating means provided therebetween; and a second assembly including a second mounting bar, a second pair of end supports, said second mounting bar secured to said end supports and accurately located with respect thereto by locating means provided therebetween, and a second plurality of comparable devices secured to said second mounting bar and accurately located with respect thereto by locating means provided therebetween; said first assembly disposed above and secured to said second assembly so that guide surfaces incorporated in said end supports accurately locate said first assembly with respect to said second assembly, the locating means provided in said mounting bars, end supports and devices so located that with said first assembly disposed with respect to said second assembly by said guide surfaces said first devices are each accurately located with respect to a corresponding one of said second devices to thereby allow an interacting relationship to be set up therebetween.

3. A mounting arrangement for accurately locating one device above another comprising: a first assembly including first mounting means and a first plurality of comparable devices secured to said first mounting means and accurately located with respect thereto by locating means provided therebetween; and a second assembly including second mounting means and a second plurality of comparable devices secured to said second mounting means and accurately located with respect thereto by locating means provided therebetween; said first assembly disposed above said second assembly so that guide means incorporated in said mounting means accurately locate said first assembly with respect to said second assembly, the locating means provided in said mounting means and devices so located that with said first assembly disposed with respect to said second assembly by said guide means, said first devices are each accurately located with respect to a corresponding one of said second devices to thereby allow an interacting relationship to be set up therebeween.

4. A mounting arrangement for accurately locating one device above another comprising: a first assembly including first mounting means and a first plurality of comparable switch devices located side by side and secured to said first mounting means and accurately located with respect thereto by locating means provided therebetween; a second assembly including second mounting means, a second plurality of comparable modular devices located side by side and secured to said second mounting means and accurately located with respect thereto by locating means provided therebetween, said second devices each including an opening therethrough and aligned with the openings of the other second devices, and cam members disposed in said aligned openings, said second devices each sharing a cam member with an adjacent second device; said first assembly disposed above said second assembly so that guide means incorporated in said mounting means accurately locate said first assembly with respect to said second assembly, the locating means provided in said mounting means and devices so located that with said first assembly disposed with respect to said second assembly by said guide means said first devices are each accurately located with respect to a corresponding one of said second devices; and driving means associated with and extending between corresponding first and second devices arranged to interact with said cam members so as to provide a "no two operate" mechanism.

5. A mounting arrangement for accurately locating one device above another comprising: a first assembly including first mounting means and a first plurality of comparable switch devices located side by side and secured to said first mounting means and accurately located with respect thereto by locating means provided therebetween; a second assembly including second mounting means, a second plurality of comparable modular devices located side by side and secured to said second mounting means and accurately located with respect thereto by locating means provided therebetween, said second devices each including an opening therethrough and aligned with the openings of the other second devices, and driven means disposed in said aligned openings; said first assembly disposed above said second assembly so that guide means incorporated in said mounting means accurately locate said first assembly with respect to said second assembly, the locating means provided in said mounting means and devices so located that with said first assembly disposed with respect to said second assembly by said guide means said first devices are each accurately located with respect to a corresponding one of said second devices; and driving means associated with and extending between corresponding first and second devices arranged to interact with said driven means so as to provide a "no two operate" mechanism.

6. A mounting arrangement: a first plurality of comparable switch devices; a second plurality of comparable modular devices appropriately secured together, said second devices each having a guideway thereacross and aligned with the guideways of the other second devices and driven means disposed in said guideways; said first devices fixedly disposed above and each located with respect to one of said second devices; and driving means associated with and extending between corresponding first and second devices arranged to interact with said driven means so as to provide a "no two operate" mechanism.

7. A mounting arrangement for accurately locating one device with respect to another comprising: a first plurality of comparable actuator devices accurately located with respect to each other; and an assembly including mounting means and a second plurality of comparable actuated devices secured to said mounting means and accurately located with respect thereto by locating means provided therebetween, said first devices fixedly disposed above and with respect to said assembly and with each of said first devices located with respect to a corresponding one of said second devices to thereby allow an interacting relationship to be set up therebetween.

No references cited.

ROBERT K. SCHAEFER, *Primary Examiner.*

H. O. JONES, *Assistant Examiner.*